(12) United States Patent
Birkby et al.

(10) Patent No.: US 7,762,061 B2
(45) Date of Patent: Jul. 27, 2010

(54) APPARATUS AND METHOD FOR OPERATING AN EMISSION ABATEMENT SYSTEM

(75) Inventors: Nicholas J. Birkby, Goosnargh (GB);
Clive D. Telford, Lancaster (GB);
Graham K. Hargrave, Quorn (GB)

(73) Assignee: EMCON Technologies LLC, Wilmington, DE (US)

( * ) Notice: Subject to any disclaimer, the term of this patent is extended or adjusted under 35 U.S.C. 154(b) by 468 days.

(21) Appl. No.: 11/697,850

(22) Filed: Apr. 9, 2007

(65) Prior Publication Data

US 2008/0245055 A1    Oct. 9, 2008

(51) Int. Cl.
*F01N 3/00* (2006.01)

(52) U.S. Cl. ............... 60/286; 60/274; 60/295; 60/297; 60/303; 60/317; 222/145.5; 222/145.6; 239/416.4; 239/418; 239/424

(58) Field of Classification Search ............ 602/274, 602/286, 295, 297, 301, 303, 289, 317; 222/145.5, 222/145.6; 239/416.4, 416.5, 418, 423, 424
See application file for complete search history.

(56) References Cited

U.S. PATENT DOCUMENTS

| | | | | |
|---|---|---|---|---|
| 3,841,824 A | * | 10/1974 | Bethel | 431/8 |
| 4,260,110 A | * | 4/1981 | Werding | 239/404 |
| 6,192,677 B1 | * | 2/2001 | Tost | 60/286 |
| 6,526,746 B1 | * | 3/2003 | Wu | 60/286 |
| 6,848,251 B2 | * | 2/2005 | Ripper et al. | 60/286 |
| 7,481,045 B2 | * | 1/2009 | Fayard | 60/295 |
| 7,497,077 B2 | * | 3/2009 | Dodge et al. | 60/286 |

* cited by examiner

*Primary Examiner*—Bihn Q. Tran
(74) *Attorney, Agent, or Firm*—Pamela A. Kachur

(57) ABSTRACT

A method of operating an emission abatement system includes advancing a liquid agent to an atomizing nozzle and advancing pressurized air to the atomizing nozzle. The method further includes impinging the pressurized air on the liquid agent at a tip of the atomizing nozzle to shear liquid agent particles from the liquid agent. The method further includes advancing the liquid agent particles through the atomizing nozzle to an emission abatement device. An emission abatement system and atomizer apparatus are also disclosed herein.

16 Claims, 4 Drawing Sheets

Fig. 2

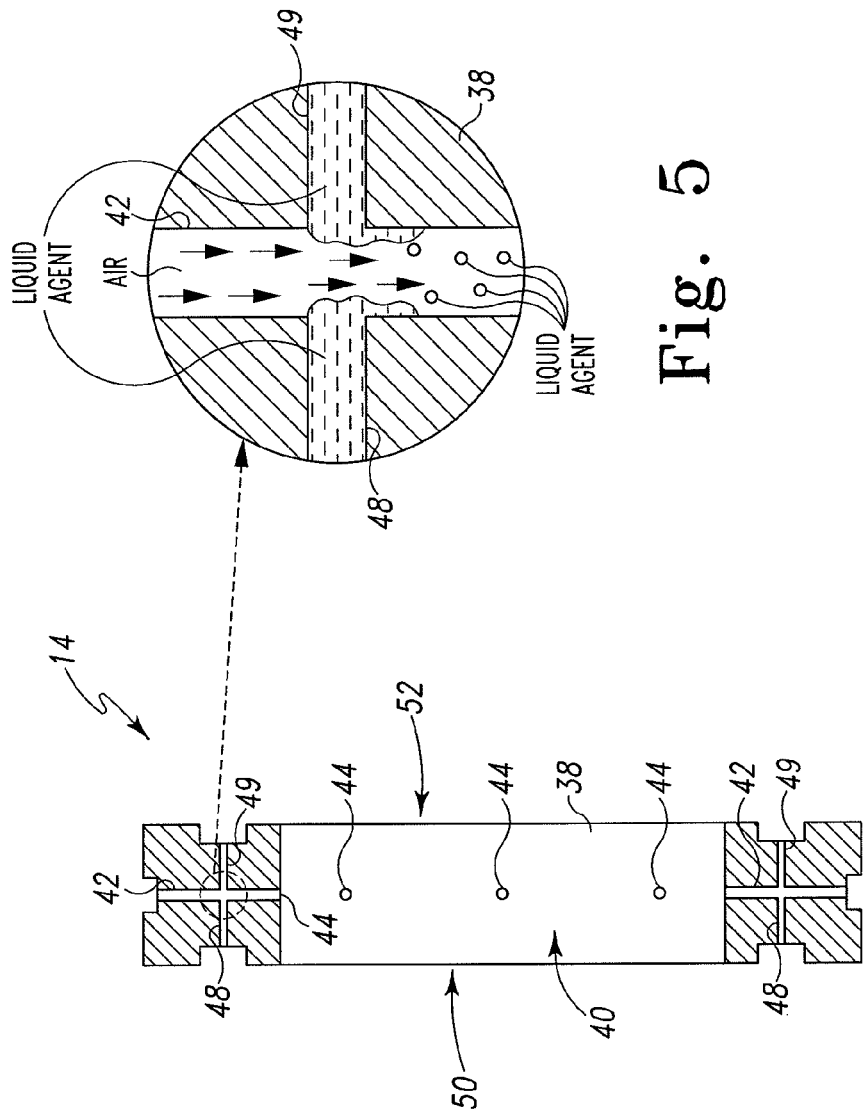

APPARATUS AND METHOD FOR OPERATING AN EMISSION ABATEMENT SYSTEM

FIELD OF THE DISCLOSURE

The present disclosure relates generally to atomizers, and specifically, to atomizing nozzles used with liquid agents in emission abatement systems.

BACKGROUND

Atomizers are typically used in an emission abatement system for atomizing a liquid agent to be used for abating emissions such as those present in exhaust gases produced through operation of an internal combustion engine. For example, hydrocarbon fuel may be atomized for use in an exothermic reaction for regenerating a soot particulate filter that traps soot present in the exhaust gases of an engine. Urea may be atomized and used as a reductant in selective catalytic reduction catalysts, which reduce the oxides of nitrogen typically present in the engine exhaust. Pressurized air can be mixed with a particular liquid agent at a location upstream of the an atomizing nozzle used to ultimately deliver an atomized spray for use in an emission abatement system.

SUMMARY

According to one aspect of the disclosure, a method of operating an emission abatement system may comprise advancing a liquid agent to an atomizing nozzle and advancing pressurized air to the atomizing nozzle. The method may further include impinging the pressurized air on the liquid agent at a tip of the atomizing nozzle to shear liquid agent particles from the liquid agent. The method may further include advancing the liquid agent particles through the atomizing nozzle to an emission abatement device.

According to another aspect of the disclosure, an emission abatement system may include an atomizing nozzle. The system may further include a supply of liquid being deliverable to the nozzle through a liquid agent line. The system may further include a supply of pressurized air being deliverable to the atomizing nozzle to impinge on the liquid agent at a tip of the atomizing nozzle. The system may further include an emission abatement device disposed downstream of the atomizing nozzle.

According to another aspect of the disclosure, an atomizing apparatus may include a body being substantially cylindrical in shape, and having an opening concentric with a circular cross-section and the opening being disposed therethrough. The body may further include a number of air channels disposed radially therethrough and a number of first liquid agent channels disposed therethrough. Each first liquid agent channel may be in fluid communication with one of the number of air channels. The apparatus may further include a supply of liquid agent in fluid communication with each of the number of first liquid agent channels and a supply of pressurized air in fluid communication with each of the number of air channels. The apparatus may further include a number of atomizing nozzles with each nozzle being disposed at an end of one of the number of air channels and each nozzle being directed toward the opening in the body.

According to another aspect of the disclosure, an atomizing apparatus may include a first and second atomizing nozzle, a supply of liquid agent, and a first and second supply of pressurized air. The apparatus may further include an air line having the first atomizing nozzle disposed at an end thereof and being in fluid communication with the first supply of pressurized air. The apparatus may further include a liquid agent line disposed within the air line. The liquid agent line may have the second atomizing nozzle disposed at an end thereof and being in fluid communication with the supply of liquid agent and the second supply of pressurized air.

BRIEF DESCRIPTION OF THE DRAWINGS

The detailed description particularly refers to the accompanying figures in which:

FIG. 2 is a diagrammatic cross-sectional view of an exemplary atomizing apparatus;

FIG. 4 is a diagrammatic cross-sectional side view of the exemplary atomizing apparatus of FIG. 3; and FIG. 5 is a diagrammatic enlarged view of a portion of the exemplary atomizing apparatus of FIG. 3.

DETAILED DESCRIPTION OF THE DRAWINGS

Figure 1:
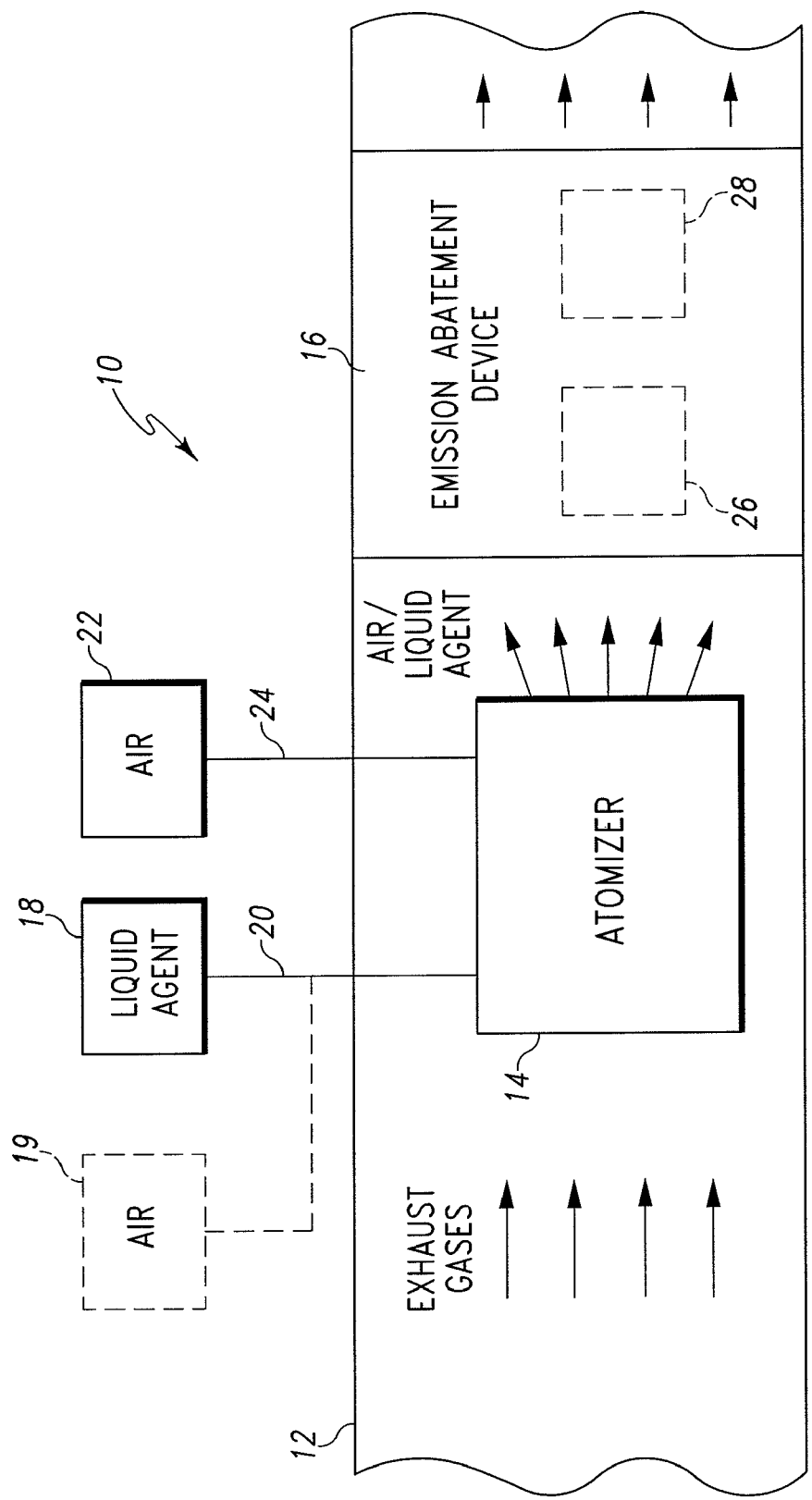
FIG. 1 is a diagrammatic view of an exemplary exhaust system.
Figure 3:
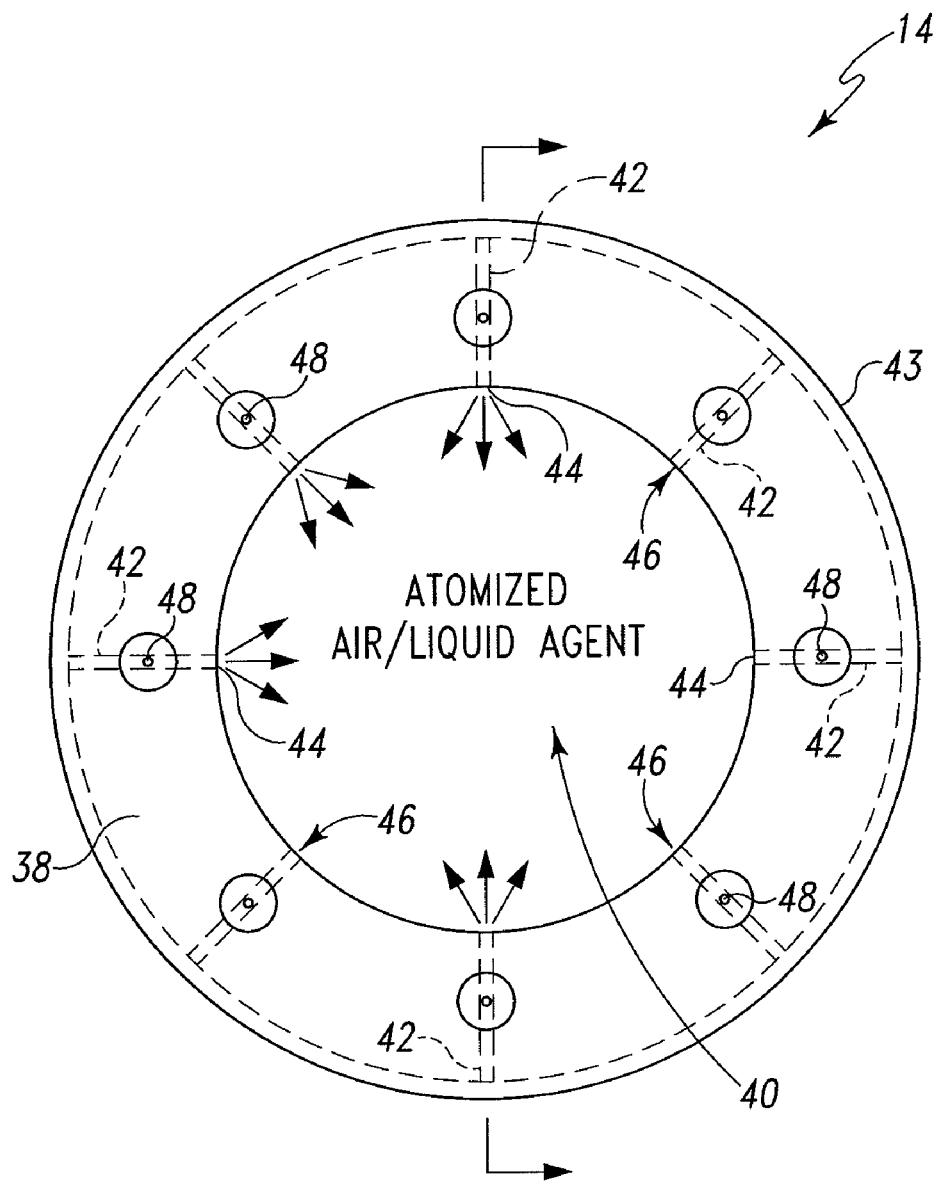
FIG. 3 is a diagrammatic end view of another exemplary atomizing apparatus.

As will herein be described in more detail, FIG. 1 shows a diagrammatic view of an exemplary exhaust system 10. The exhaust system 10 includes an exhaust pipe 12 through which exhaust gases may flow from a source such as an internal combustion engine (not shown). The arrows shown in FIG. 1 provide an exemplary representation of the flow direction of various gases and/or fluids that may be present in the exhaust system 10.

An atomizer 14 and an emission abatement device 16 are disposed in the exhaust pipe 12 with the atomizer 14 being located upstream of the emission abatement device 16. The atomizer 14 may receive a mixture of a liquid agent and air to produce an atomized spray to be subsequently used for emissions abatement. In this exemplary embodiment, the atomizer 14 receives a liquid agent from a liquid agent supply 18 through a liquid agent line 20 and pressurized air from an air supply 22 through an air line 24. An optional air supply 19 may be implemented to mix air with the liquid agent prior to being advanced to the atomizer 14 through a liquid agent line 20.

In this exemplary embodiment, pressurized air from the air supply 22 may impinge the liquid agent (or agent/air mixture) just prior to being injected from the atomizer 14 into the exhaust pipe 12, which causes the liquid agent to be sheared into smaller particles than would be created through impingement occurring at a point further upstream of the liquid agent line 20 as is conventionally done. Once the atomized liquid agent is injected into the exhaust pipe 12, it may be used for emissions abatement.

In this exemplary embodiment, the emission abatement device 16 may include an oxidation catalyst 26 and a filter 28. In one exemplary embodiment the filter 28 may be a soot particulate filter. Hydrocarbon fuel may be used as the liquid agent which is atomized and aided in advancement by the flow of exhaust gases downstream to the oxidation catalyst 26. The catalyst 26 will catalyze an exothermic reaction between oxygen present in the exhaust gases and atomized air with the injected fuel. The catalyst 26 includes catalytic material disposed on a substrate. The catalytic material may be a precious metal, such as platinum or palladium, for example. The highly exothermic reaction produces heat that is transferred to the downstream-positioned particulate filter 28.

The particulate filter 28 of the emission abatement device 16 may be configured to trap soot particles present in the exhaust gases. From time-to-time, the filter 28 needs to be regenerated when becoming full of soot. The heat generated through the exothermic reaction may be used to raise the temperature of the soot particles trapped in the filter 28 to a temperature sufficient to ignite the particles thereby regenerating the particulate filter 28. It should be appreciated that the particulate filter 28 may be coated with catalytic material thereby eliminating the need for the oxidation catalyst 26.

In an alternative exemplary embodiment, the emissions abatement device 16 may include a selective catalytic reduction catalyst, which reduces the oxides of nitrogen present in exhaust gases. Urea may be used as the liquid agent in supply 18 to reduce the oxides of nitrogen at appropriate times.

Figure 2:
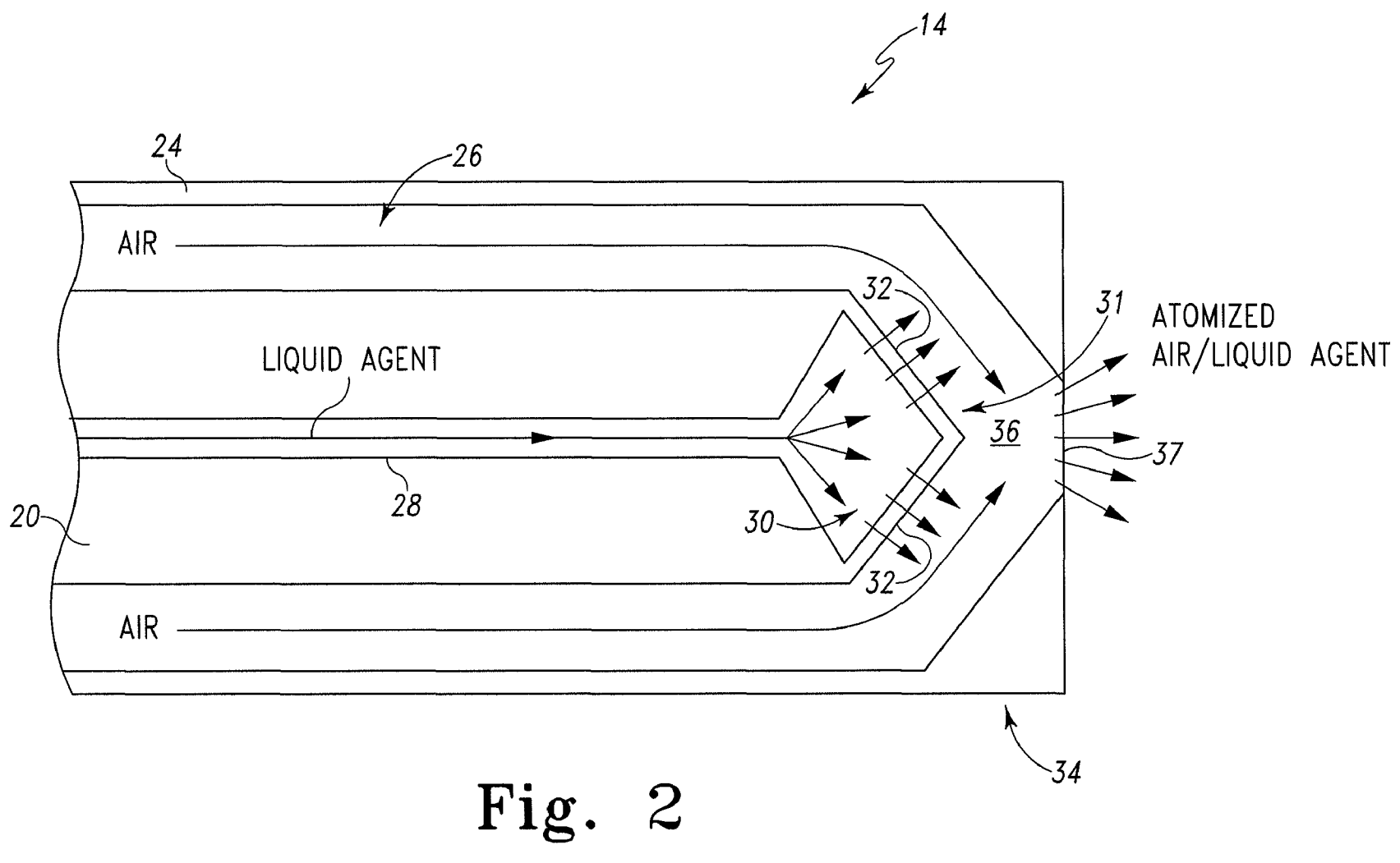

FIG. 2 shows a diagrammatic cross-section of an atomizer 14 configuration that may be used in the exhaust system 10. In this exemplary embodiment, the liquid agent line 20 is disposed within the air line 24 such that the pressurized air in the air line 24 is advanced around the agent line 20. The agent line 20 includes a channel 28 through which a liquid agent (or an agent/air mixture) is advanced. At an end 31 of the fuel line 20 is a dispersion chamber 30 and an atomizing nozzle 32. The dispersion chamber 30 allows the agent to be dispersed into a larger area than that of the channel 28. Once the agent reaches the dispersion chamber 30, the agent may be initially atomized with the atomizing nozzle 32, which injects the atomized agent into an area 36 located at the nozzle tip 37 of an atomizing nozzle 34. At the nozzle tip 37, the atomized agent is impinged on by the pressurized air traveling through the channel 26 of the air line 24. The impingement by the pressurized air causes a "film stripping" effect, which shears smaller particles of agent from the particles created through the use of atomizing nozzle 32. The pressurized air also forces the agent through the atomizing nozzle 34, which, due to the film stripping, provides smaller atomized particles than those created through conventional atomization. It should be appreciated that while the atomizer 14 shown in FIG. 1 is configured to deliver an axial atomized spray with respect to the longitudinal axis of the exhaust pipe 12, an atomizer 14 may be configured to deliver liquid agent radially outwardly with respect to the air line 24.

FIG. 3 shows a diagrammatic end view of another exemplary atomizer 14 that may be used with the exhaust system 10. In this exemplary embodiment, the body 38 is cylindrically-shaped, which can be formed to fit within various exhaust pipes 12 having substantially circular cross-sections. The body 38 includes an opening 40 concentrically disposed therein, which allows exhaust gases to pass therethrough when traveling downstream in the exhaust pipe 12.

The body 38 includes a number of air channels 42 radially disposed therein. The air channels 42 extend through the body 38 allowing the opening 40 to be in fluid communication with the area surrounding the outer surface 43 of the body 38. An atomizing nozzle 44 is disposed at an end 46 of each air channel 42 proximate to the opening 40.

FIG. 4 shows a cross-sectional side view of the atomizer 14. In this exemplary embodiment, the body 38 is shown to include a number of liquid channels 48, 49 which are disposed within the body 38 such that the liquid channels are substantially parallel with the longitudinal axis of the body 38. Each liquid channel 48, 49 is in fluid communication with one of the air channels 42 and the area surrounding ends 50, 52 of the body 38.

The configuration shown in FIGS. 3 and 4 of the atomizer 14 allows the liquid agent to be supplied through the liquid channels 48 and pressurized air to be supplied through the air channels 42 through liquid agent line 20 and air line 24, respectively, in a manner similar to that shown in FIG. 1. FIG. 5 shows an enlarged view of the manner in which the air and liquid agent interact at each liquid channel 48, 49/air channel 42 intersection. Pressurized air is supplied to the air channel 42 and advanced toward the opening 40. A liquid agent is advanced from a liquid agent supply 18 into liquid channel 48, 49 through each end 50, 52 as illustrated in FIG. 5. Fuel advancing through the liquid channels 48, 49 reaches the air channel 42. The pressurized air flowing through the air channel 42 impinges on the liquid agent that has advanced into the air channel 42 providing enough force to shear particles from the liquid agent entering the air channel 42. The liquid agent particles are further advanced through the air channel 42 from the movement of the pressurized air such that that liquid agent particles reach the respective atomizing nozzle 44, where the particles are atomized and sprayed into opening 40 as illustrated through the arrows shown in FIGS. 3 and 4.

When the atomizer 14 is disposed in the exhaust pipe 12, exhaust gases flow through the opening 40 thereby carrying the atomized liquid agent downstream to other portions of an exhaust system 10, such as an emission abatement device 16. The shearing of the liquid agent with the pressurized air at a position proximate to the atomizing nozzles 44 allows smaller particles to be to be advanced through the atomizing nozzle 44. It should be appreciated that the atomizer 14 shown in FIGS. 3-5 may be configured such that only a single liquid channel 48 or 49 is used and disposed through an end 50, 52 of the body 38 for delivering a liquid agent to an air channel 42.

It should be further appreciated that the atomizer 14 can be dimensioned to meet particular configurations. For example, the cylindrically-shaped atomizer shown in FIGS. 3 and 4 can be dimensioned to fit various-sized exhaust pipes. This allows an exhaust pipe 12 to include portions having different diameters. This allows a portion of the exhaust pipe 12 having a first diameter positioned upstream of another portion having a second diameter with the second diameter being greater than the first. This configuration permits the atomizer 14 to be dimensioned to fit within the portion having the second diameter, which allows the atomizer 14 to include an opening 40 large enough to reduce the amount of atomized air/fuel mixture injected injected across the opening 40 onto a portion of the inner surface of the body 38. Furthermore, having the expanded pipe downstream allows the exhaust gases flowing therethrough to expand before reaching the atomizer 14. It should also be further appreciated that a similar configuration can be done for the atomizer 14 shown in FIG. 2.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of apparatus, systems, and methods that incorporate one or more of the features of the present disclosure and fall within the spirit and scope of the present disclosure.

The invention claimed is:

1. A method of operating an emission abatement system comprising:

positioning an atomizer within an exhaust pipe, the atomizer including an atomizing nozzle, a liquid agent line, and a pressurized air line;

locating an emission abatement device within the exhaust pipe and downstream of the atomizer;

advancing a liquid agent comprising a hydrocarbon fuel within the exhaust pipe and through the liquid agent line to the atomizing nozzle;

advancing pressurized air within the exhaust pipe and through the pressurized air line to the atomizing nozzle;

impinging the pressurized air on the hydrocarbon fuel at a tip of the atomizing nozzle to shear hydrocarbon fuel particles from the hydrocarbon fuel;

advancing the hydrocarbon fuel particles through the atomizing nozzle to the emission abatement device that includes a particulate filter; and regenerating the particulate filter.

2. The method of claim 1, further comprising advancing the liquid agent through a second atomizing nozzle disposed at an end of the liquid agent line prior to impinging the pressurized air on the liquid agent, and wherein both atomizing nozzles are positioned within the exhaust pipe.

3. The method of claim 1, wherein:

the atomizer comprises a body fit within the exhaust pipe wherein the body includes a first channel forming a portion of the liquid agent line and a second channel forming a portion of the pressurized air line, and wherein advancing the liquid agent comprises advancing the liquid agent to the nozzle through the first channel, and advancing the pressurized air comprises advancing the pressurized air through the second channel.

4. The method of claim 3, wherein the first and second channels intersect each other, and wherein advancing the liquid agent further comprises advancing the liquid agent to the atomizing nozzle by directing liquid agent into the second channel with pressurized air.

5. A method of operating an emission abatement system comprising:

positioning an atomizer within an exhaust pipe, the atomizer including an atomizing nozzle, a liquid agent line, and a pressurized air line, and wherein the atomizer comprises a body fit within the exhaust pipe wherein the body includes a first channel forming a portion of the liquid agent line and a second channel forming a portion of the pressurized air line with the first and second channels intersecting each other, and wherein the body, includes a third channel forming another portion of the liquid agent line wherein the first and third channels intersect the second channel at opposing sides;

locating an emission abatement device within the exhaust pipe and downstream of the atomizer;

advancing a liquid agent within the exhaust pipe and through the liquid agent line to the atomizing nozzle;

wherein supplying the liquid agent further comprises advancing the liquid agent to the atomizing nozzle through the first channel, the third channel, and a portion of the second channel;

advancing pressurized air within the exhaust pipe and through the pressurized air line to the atomizing nozzle, including advancing the pressurized air through the second channel, and wherein advancing the liquid agent further comprises advancing the liquid agent to the atomizing nozzle by directing liquid agent into the second channel with pressurized air;

impinging the pressurized air on the liquid agent at a tip of the atomizing nozzle to shear liquid agent particles from the liquid agent; and advancing the liquid agent particles through the atomizing nozzle to the emission abatement device.

6. The method of claim 1, wherein advancing the hydrocarbon fuel particles further comprises advancing the hydrocarbon fuel particles through the atomizing nozzle to an oxidation catalyst resulting in an exothermic reaction that increases heat for regenerating the particulate filter.

7. A method of operating an emission abatement system comprising:

positioning an atomizer within an exhaust pipe, the atomizer including an atomizing nozzle, a liquid agent line, and a pressurized air line;

locating an emission abatement device within the exhaust pipe and downstream of the atomizer;

advancing a liquid agent within the exhaust pipe and through the liquid agent line to the atomizing nozzle wherein the liquid agent comprises urea;

advancing pressurized air within the exhaust pipe and through the pressurized air line to the atomizing nozzle, impinging the pressurized air on the urea at a tip of the atomizing nozzle to shear urea particles from the urea; and advancing the urea particles through an atomizing nozzle to the emission abatement device comprising a selective catalytic reduction catalyst resulting in reaction that reduces oxides of nitrogen.

8. An emission abatement assembly comprising:

an atomizer positioned within an exhaust pipe, the atomizer including an atomizing nozzle, a liquid agent line, and a pressurized air line, and wherein the atomizer comprises a body fit within the exhaust pipe, the body including a first channel forming a portion of the liquid agent line and a second channel forming a portion of the pressurized air line;

a supply of liquid agent being deliverable within the exhaust pipe to the atomizing nozzle through the liquid agent line, wherein the first and second channels intersect each other such that a mixture of air and liquid agent is directed toward a tip of the atomizing nozzle;

a supply of pressurized air being deliverable within the exhaust pipe to the atomizing nozzle to impinge on the liquid agent at a tip of the atomizing nozzle, and an emission abatement device disposed downstream of the atomizing nozzle.

9. The emission abatement assembly of claim 8, wherein the liquid agent line is disposed within the air line and the air line is disposed within the atomizing nozzle, and wherein an end of the liquid agent line and an end of the air line are disposed near a tip of the atomizing nozzle.

10. The emission abatement assembly of claim 9, wherein the atomizing nozzle comprises a first atomizing nozzle and wherein the end of the liquid agent line comprises a second atomizing nozzle that is positioned within the first atomizing nozzle with an open area being formed between the first and second atomizing nozzles, the open area receiving atomized particles from the second atomizing nozzle and pressurized air from the pressurized air line.

11. The emission abatement assembly of claim 9, wherein the liquid agent is deliverable through the liquid agent line to the pressurized air line.

12. The emission abatement assembly of claim 8, wherein:

the supply of liquid agent comprises a supply of hydrocarbon fuel, and the emission abatement device comprises an oxidation catalyst and a particulate filter.

13. The emission abatement assembly of claim 8, wherein:

the supply of liquid agent comprises a supply of hydrocarbons, and the emission abatement device comprises a NOx adsorber.

14. The emission abatement assembly of claim 8, wherein: the supply of liquid agent comprises a supply of urea, and the emission abatement device comprises a selective catalytic reduction catalyst.

15. The emission abatement assembly of claim 8, further comprising a third channel disposed through the body and forming a portion of the liquid agent line, and wherein the first and third channels are in fluid communication with the second channel.

16. An atomizing apparatus comprising:
a body being substantially cylindrical in shape to be fit within an exhaust pipe, the body having an opening concentric with a circular cross-section of the exhaust pipe and being disposed therethrough, a plurality of air channels disposed radially through the body, and a plurality of liquid channels disposed through the body, each liquid channel being in fluid communication with one of the plurality of air channels, and wherein each air channel extends radially through the body from an inner circumferential surface to an outer circumferential surface, and wherein each liquid channel extends axially through a thickness of the body from a downstream end to an upstream end, and wherein each air channel intersects at least one liquid channel such that pressurized air directs a mixture of air and liquid into the air channels to exit at the opening;

a supply of liquid agent in fluid communication with each of the plurality of first liquid channels, a supply of pressurized air in fluid communication with each of the plurality of air channels, and a plurality of atomizing nozzles, each nozzle disposed at an end of one of the plurality of air channels and each nozzle being directed toward the opening in the body.

* * * * *